Figure 5:
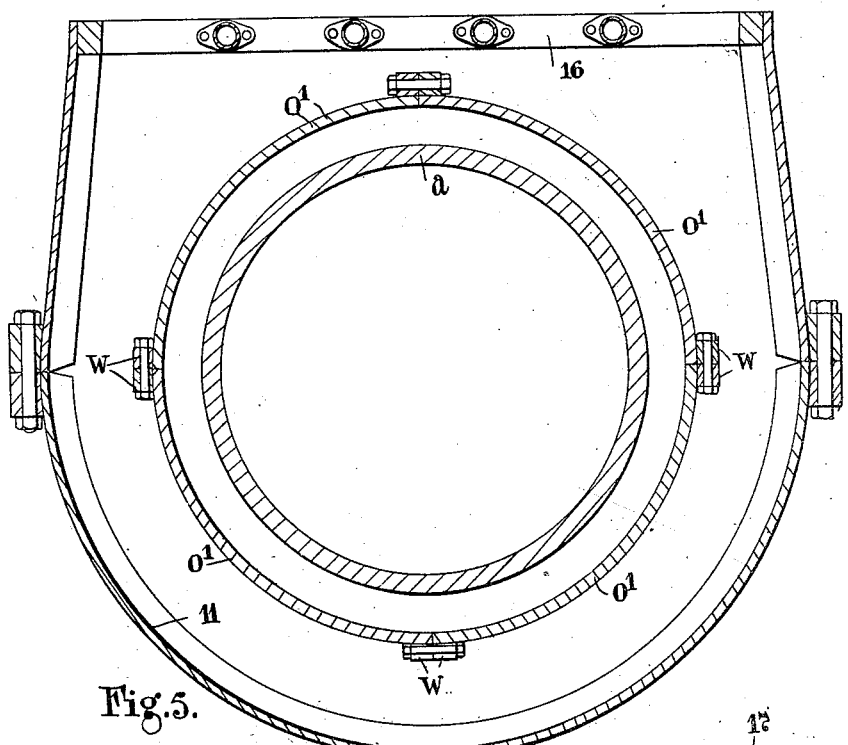

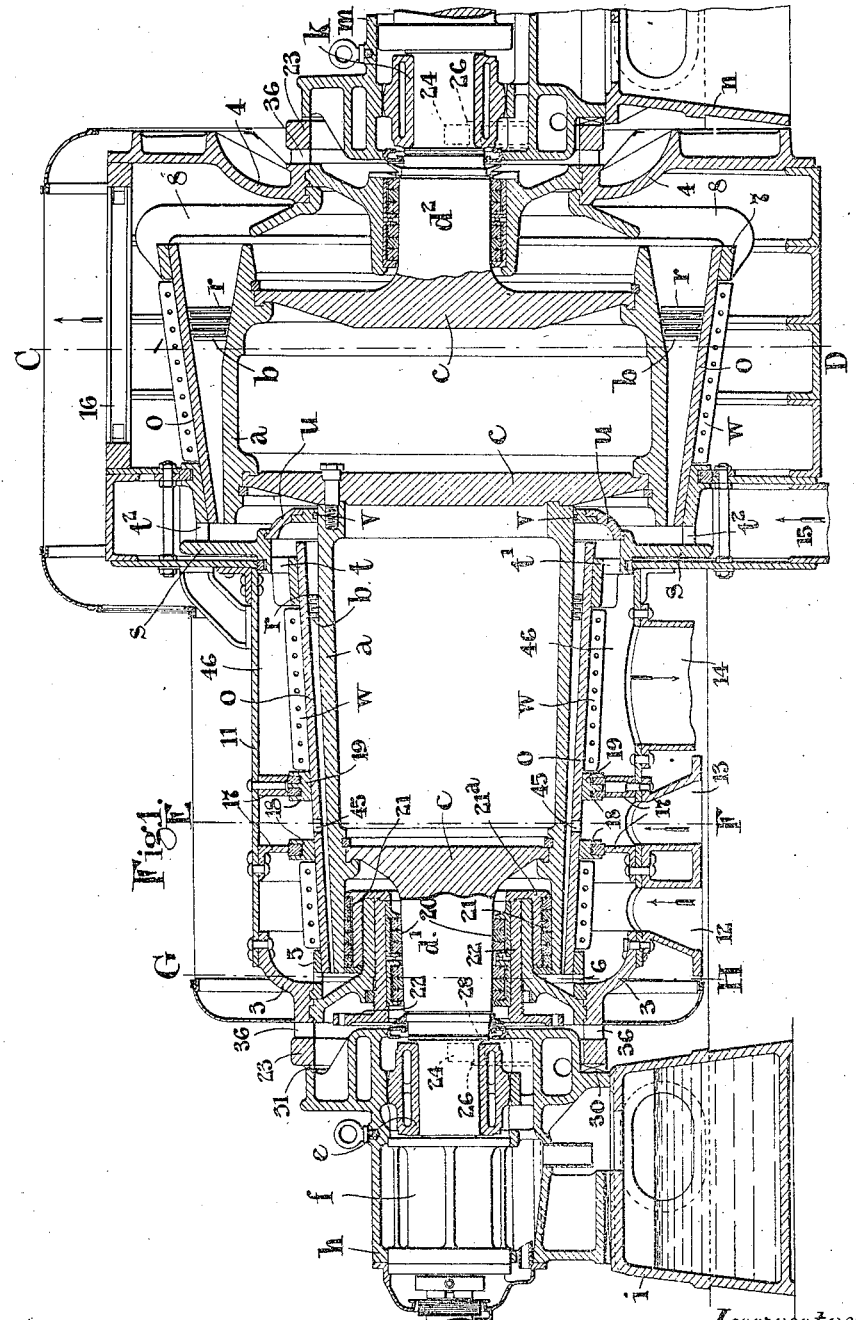

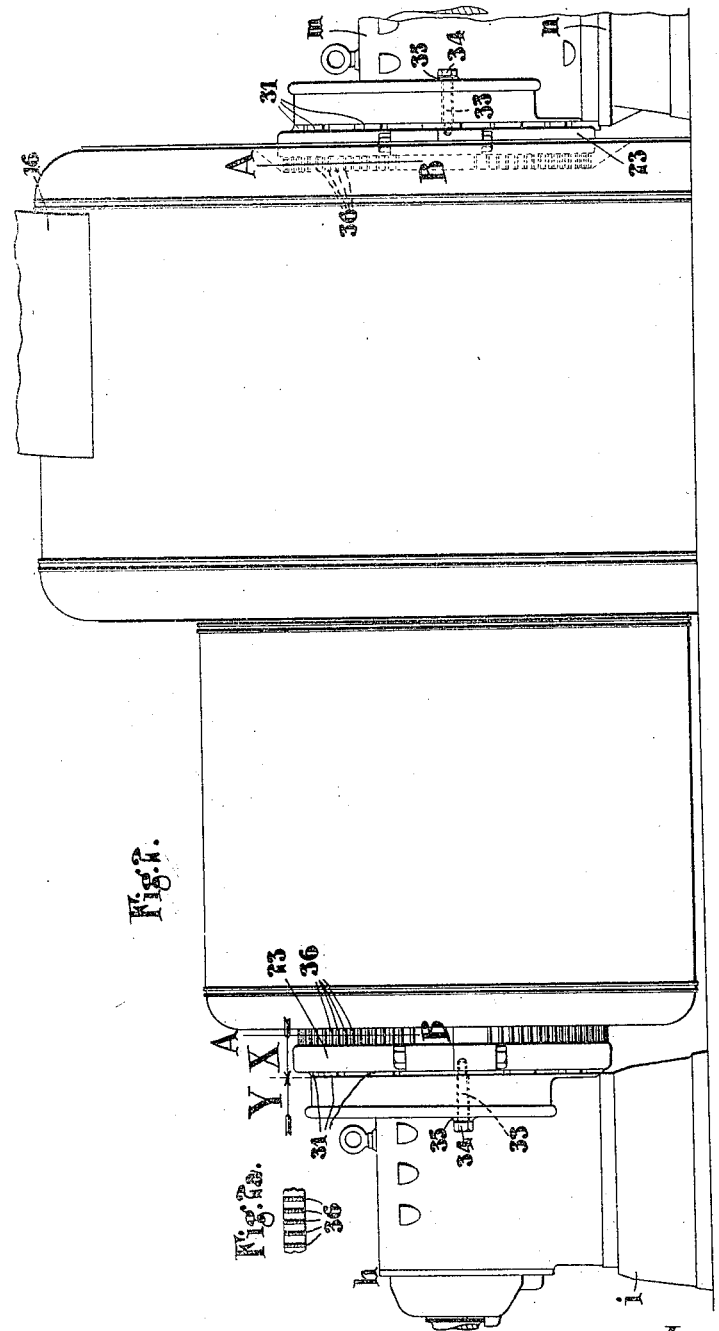

S. Z. DE FERRANTI.
ELASTIC FLUID TURBINE.
APPLICATION FILED MAY 4, 1912.
1,082,741.
Patented Dec. 30, 1913.
6 SHEETS—SHEET 3.
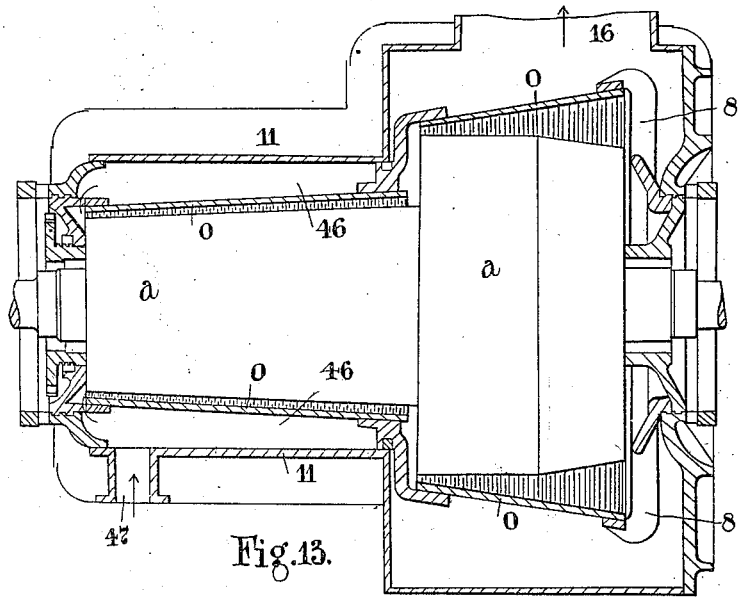
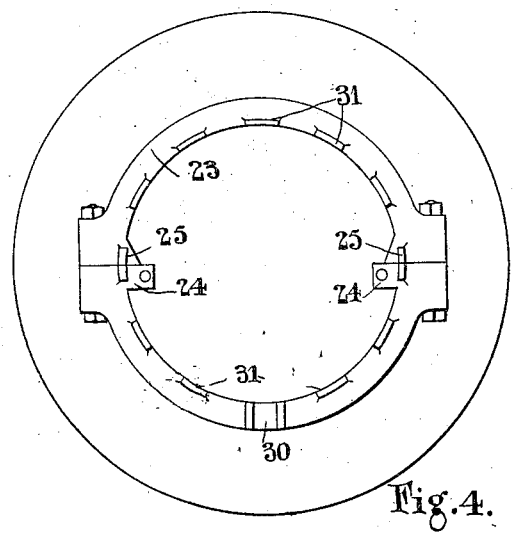
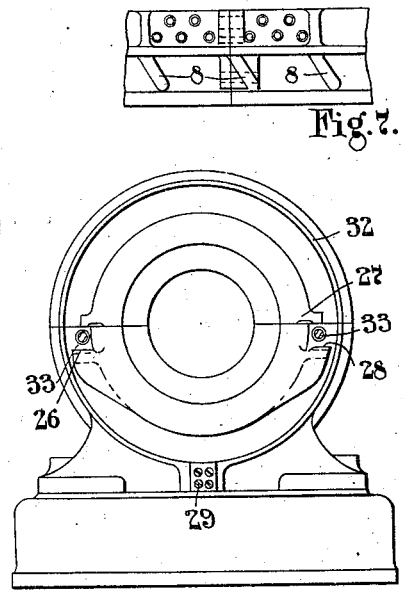

S. Z. DE FERRANTI.
ELASTIC FLUID TURBINE.
APPLICATION FILED MAY 4, 1912.

1,082,741.

Patented Dec. 30, 1913.
3 SHEETS—SHEET 4.

Witnesses.
H. M. Barrett
H. L. Alden

Inventor.
Sebastian Z. de Ferranti
By Spear, Middleton, Donaldson & Spear
Attorney

S. Z. DE FERRANTI.
ELASTIC FLUID TURBINE.
APPLICATION FILED MAY 4, 1912.

1,082,741.

Patented Dec. 30, 1913.

6 SHEETS—SHEET 5.

Witnesses.
H. M. Barrett
H. L. Alden

Inventor.
Sebastian Z. de Ferranti
By Spear, Middleton, Donaldson & Spear
Attorney.

S. Z. DE FERRANTI.
ELASTIC FLUID TURBINE.
APPLICATION FILED MAY 4, 1912.

1,082,741

Patented Dec. 30, 1913.
6 SHEETS—SHEET 6.

UNITED STATES PATENT OFFICE.

SEBASTIAN ZIANI DE FERRANTI, OF GRINDLEFORD BRIDGE, ENGLAND.

ELASTIC-FLUID TURBINE.

1,082,741. Specification of Letters Patent. Patented Dec. 30, 1913.

Application filed May 4, 1912. Serial No. 695,254.

*To all whom it may concern:*

Be it known that I, SEBASTIAN ZIANI DE FERRANTI, a subject of the King of Great Britain and Ireland, and residing at Grindleford Bridge, in the county of Derby, England, have invented certain new and useful Improvements in and Relating to Elastic-Fluid Turbines, of which the following is a specification.

This invention relates to elastic fluid turbines and though not restricted thereto is especially applicable to those of the pressure-flow type. To obtain the highest economy with such turbines the blade clearances, as is well understood, should be reduced to the lowest possible extent, and in order to secure this result in practice accuracy of workmanship in the first place and substantial maintenance of form in working notwithstanding changes of temperature are essential. The rotor member of the turbine chiefly on account of its complete symmetry of form and partly also on account of the materials of which it is commonly constructed now fulfils the necessary conditions with considerable closeness but the cast-iron casing or stator has often been complicated and unsymmetrical in form owing to its heavy flanges, numerous ribs, steam and exhaust connections, feet and so forth, the consequence being that when heated up, the casing expanded irregularly in relation to the more simply constructed rotor and in addition generally became permanently distorted in course of time. In order to prevent the running and standing parts coming into contact, therefore, the clearances had to be increased considerably beyond what would, apart from such irregular and differential expansion, be sufficient for safe working.

To overcome these difficulties turbines have been proposed in which a symmetrical blade-carrying stator is inclosed within an outer casing and the object of the present invention is to improve such constructions in order that they may more nearly meet practical requirements. With this object the separation of the blade-carrying stator from the outer casing is carried a stage farther, the stator instead of being as heretofore influenced by irregular expansion of the more or less cylindrical casing, being clear thereof and supported by members which do not share in the inevitable distortions of such casing.

To attain the best results as regards maintenance of form with change of temperature in the stator itself, the latter should be as simple and symmetrical in construction as a rotor drum with a complete absence of unsymmetrical projections of any kind, while the stresses under which it works should also be symmetrically distributed, care being therefore taken to avoid methods of blade attachment which stress the stator irregularly, uneven loading due to the action of the working fluid on the blades or to other causes and all other stresses due to want of symmetry.

Other improvements which form part of the present invention are set forth specifically in the claims appendant hereto.

With the constructions now proposed the blade-carrying stator expands freely and symmetrically and is entirely uninfluenced by distortions of the outer casing.

To sum up, the fundamental principle on which the present invention is based consists in providing entirely separate organs to fulfil respectively the different functions now performed by the casing or stator alone so that the blade-carrying stator according to the present invention is relieved of all those influences tending to cause distortion.

Figure 1A:
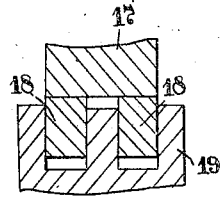
Figure 6:
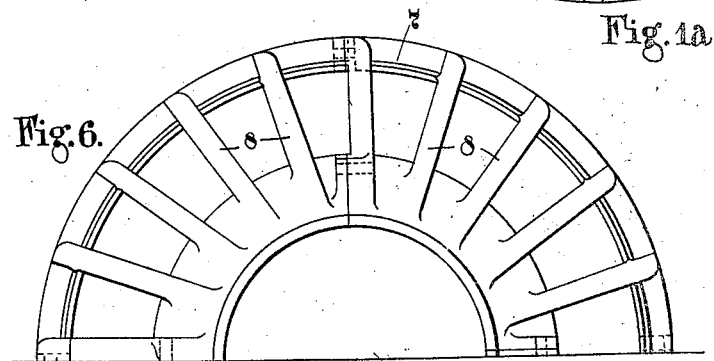
Figure 14:
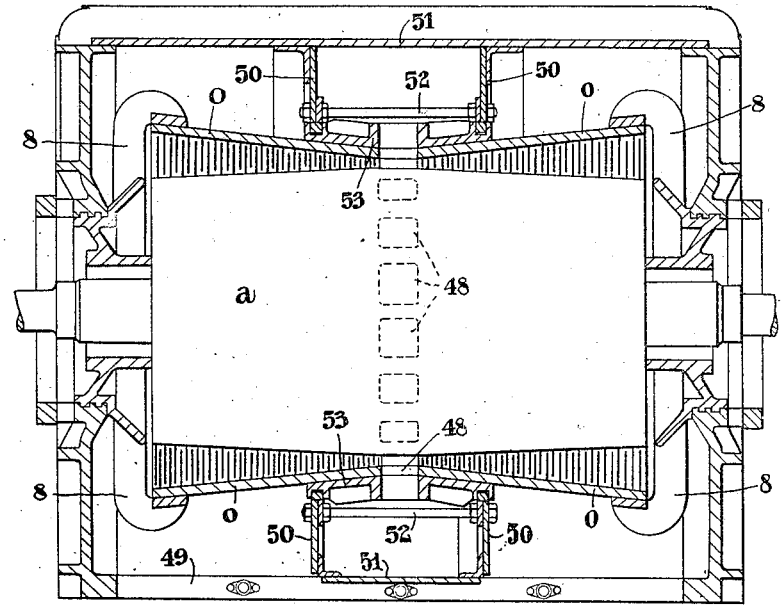
Figure 8:
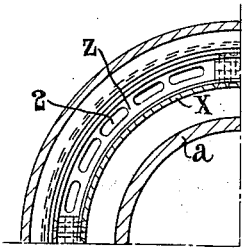
Figure 9:
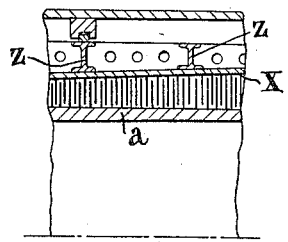
Figure 5A:
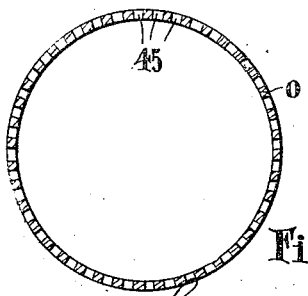
Figure 10:
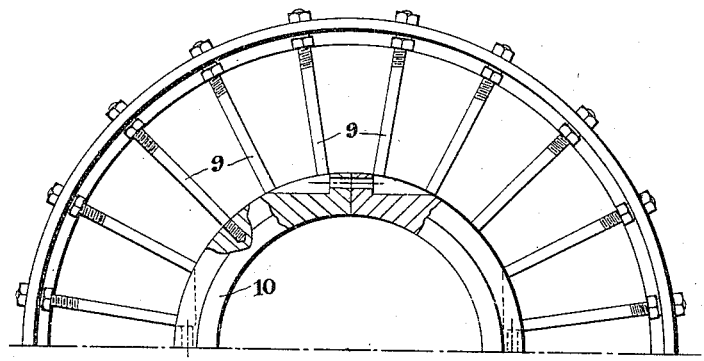
Figure 11:
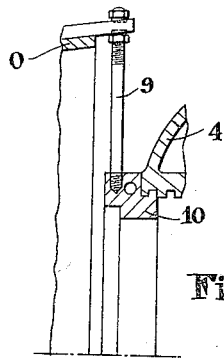
Figure 12:
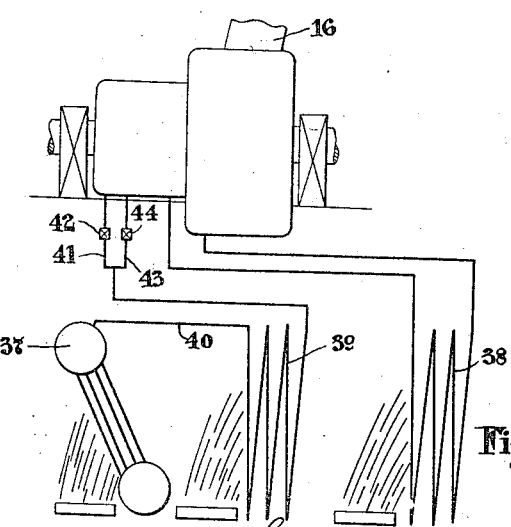

Referring to the accompanying drawings, which form part of the specification: Figure 1 shows a sectional elevation of one form of turbine according to the present invention, Fig. 1$^a$ being a detail, to a larger scale of the diaphragm packing; Fig. 2 shows an elevation of the turbine of Fig. 1, Fig. 2$^a$ being a developed cross-section on either of the lines A—B showing a few of the heat-insulating ribs; Fig. 3 shows an end elevation of the bearing at the high pressure end looking in the direction of the arrow X in Fig. 2, and Fig. 4 an end elevation of the same end of the turbine casing looking in the direction of the arrow Y; Fig. 5 shows a cross-section through the low pressure end of the turbine on the line C—D of Fig. 1; Fig. 5$^a$ is a cross-section on the line E—F or G—H of Fig. 1 to show the symmetrical arrangement of ducts; Fig. 6 is an elevation of the upper half of the stator spider at the low pressure end looking toward the left in Fig. 1, Fig. 7 being a developed view of a part of the same spider as seen from above in Fig. 1, to show inclination of main arms; Fig. 8 shows a quadrant in end view of a modified form of stator construction, Fig. 9 being a corresponding side view; Fig. 10 shows an end view of a modified form of spider, Fig. 11 being a corresponding side view; Fig. 12 shows a diagrammatic view of a turbine of the type shown in Fig. 1 in relation to a superheating system; Fig. 13 shows a diagram of a modified form, while finally Fig. 14 shows a diagrammatic view of another modification.

Corresponding parts of the different figures are denoted by the same reference symbols.

The invention will be first described by way of example applied to a horizontal drum turbine in which the steam after initial superheating is partly expanded in the turbine and passed into a reheater before completing its expansion. According to one form of such an application (see Figs. 1 to 7), the rotor member is built up of drums, $a$, $a$, carrying blades, $b$, $b$, a few only of which are shown, the drums being mounted on disks, $c$, $c$, in any suitable manner; in the example shown three disks are used, those at the ends being integral respectively with the rotor shafts, $d^1$, $d^2$. The shaft, $d^1$, at the high pressure end is carried in bearings, $e$, the latter bearing and the thrust-block, $f$, being mounted in a common housing, $h$, slidable longitudinally on its pedestal, $i$. The thrust-block, $f$, may be of any convenient construction admitting of no substantial end movement between the shaft, $d^1$, and the slidable housing, $h$. The shaft, $d^2$, at the low pressure end is carried in bearings, $k$, inclosed within a housing, $m$, which in this case is fixed to its pedestal, $n$, a certain amount of end play being provided between this shaft and its bearings. The stator member consists of two drums, $o$, $o$, corresponding to the rotor drums and carrying blades, $r$, some of which are indicated in Fig. 1; the two drums are connected by a member, $s$, provided with symmetrically disposed apertures, $t^1$, $t^2$, through which the steam passes as hereinafter described, the member, $s$, carrying a diaphragm, $u$, packed in any suitable manner; $e$. $g$., by the ring of packing, $v$, to prevent passage of steam from one side of the diaphragm to the other. The stator drums themselves according to the form shown (see Fig. 5) are built in quadrants, $o^1$, $o^1$, so that expansion and contraction may be as symmetrical as possible, each quadrant having fixed to it along each longitudinal edge, a flange, $w$, by means of which it is bolted to the adjacent quadrants.

According to a modified form, (see Figs. 8 and 9) the stator may consist of quadrants of thin plate, $x$, carrying the blades, the structure being stiffened at intervals by circumferential girders, $z$, riveted in place as shown and immersed in the working fluid. With the exception of those on which bear the piston-rings to be hereinafter described, the girders may be provided with apertures, 2, as shown.

The stator drums, $o$, $o$, are attached to and carried by the main end castings, 3 and 4, at the high pressure and low pressure ends respectively, the connection at the high pressure end being made by way of the member, 5, provided with steam passages, 6, symmetrically arranged (see Fig. 5$^a$) and at the low pressure end by way of the spider, 7. As seen in Figs. 6 and 7, the arms, 8, of the spider are angled to agree more or less with the direction of the steam as it issues from the low pressure blades.

According to a modified form (see Figs. 10 and 11) the spider may be constructed of radial spokes, 9, screwed at their inner ends into a ring, 10, which is supported on the end casting, 4, and at their outer ends secured to the stator drum as shown. Where such a bicycle-wheel construction is used at both ends, the spokes may be arranged more or less tangential in order the better to take up the reactive torque on the stator or any other means may be employed for securing rigidity in this connection.

The blade-carrying stator as described is surrounded by an external casing, 11, of cylindrical or other convenient shape, also carried by the end castings, 3 and 4, the casing being conveniently built up of plates, angles, channels and so forth riveted together and carrying the pipe connections, 12, 13 and 14; other passages through the casing are indicated at 15 and 16. The end portions may be of cast steel or dished steel plate and should be stiff enough to be substantially unaffected by distortions of the casing, 11. The space between the stator and the casing thus forms an annulus through which steam passes as hereinafter described. Where necessary special diaphragms are provided in this annulus and in order to allow for differential expansion between casing and stator both in the radial and longitudinal directions each of such diaphragms may consist of a member, 17, projecting inwardly from the casing, and co-acting with one or more solid (continuous) piston-rings, 18, inserted yieldably in a grooved carrier, 19, secured to the blade-carrying stator. A similar piston-ring is also shown on the member, $s$, bearing directly against part of the casing, 11.

To prevent leakage of steam or air along the rotor shafts where they pass out of the casing, suitable packings, 20, are provided, those shown by way of example being formed of carbon segments in the manner described in my English patent specification No. 5169 of 1910. As explained therein for purposes of adjustment the co-acting surfaces of the packing and member packed may be slightly conical and in the turbine here illustrated, the packings, 20, for the shaft and 21 for the rotor drum are so mounted that by rotation of the screwed sleeve, 22, their longitudinal position and consequently their clearance can be adjusted. The packings, 21, shown for the dummy piston or steam-excluder, 21ª, in this case are arranged not only within the rotor itself but also within a part of it carrying blades, such a disposition of parts leading to a considerable reduction in the length of the turbine.

In the case shown, where the turbine is supposed to be driving a dynamo, the dummy, 21ª, excludes steam from a considerable area of the rotor and so lessens the total thrust, the balance being taken by the thrust block. If the turbine on the other hand drives a screw propeller, the net thrust due to the pressures on the running blades and on the high-pressure end of the rotor shell outside the dummy packing are arranged to balance or nearly balance the propeller thrust. A thrust block should generally be provided in addition to take up any balance of thrust due to different conditions of working and so forth.

The end castings, 3 and 4, carrying the stator, o, and the casing, 11, are supported on the housings, h, and m, in a special manner, designed to allow the heated turbine parts to expand freely in a radial direction in relation to the cooled bearing parts, while insuring at the same time that stator and rotor remain co-axial. Thus, referring particularly to Figs. 2 to 4, the end castings, 3 and 4, have each formed on them a ring, 23, on the inside of which at about the level of the axis are two lugs, 24, (actually, the end castings, casing and stator are constructed in halves according to the usual practice and jointed on a horizontal plane through the axis, the lugs, 24, being cast on the lower half of the ring, 23, and buttressed by the abutments, 25, on the upper half; to avoid undue complexity of language, however, this horizontal joint in certain parts of the present description is ignored). The lugs, 24, rest on brackets, 26, cast on the outside of the lower half of the housings, h and m, respectively, and are held down by other lugs, 27, on the upper half of the housing. The brackets, 26, are provided with strips, 28, arranged transversely with regard to the turbine so as to prevent longitudinal movement of the lugs, 24, supported by them while allowing radial movement. (See also Fig. 1.) Moreover, a key, 29, secured to the housing, h, at its lowest part, butts against the bottom of a corresponding recess or keyway, 30, formed on the end castings, key and keyway having vertical sides allowing relative radial movement. The keys, lugs and so forth form a system of interacting guides which act to maintain the proper co-axial position of stator and rotor.

As regards provision for longitudinal expansion and contraction of the turbine parts, the housing, h, of the main bearing at the high pressure end, as described above, is slidably mounted on its pedestal and is pushed to the left on expansion of the turbine stator and casing taking place by the action of the facing strips, 31, on the ring, 23, butting against the turned face, 32, on the housing, h. The thrust of the turbine is arranged to act toward the right in Fig. 1 so as always to maintain the butting surfaces in contact during work.

To provide for the return of the bearing to the right as the turbine cools down after running, bolts, 33, screwed into the lugs, 24, on the ring, 23, pass through the enlarged part of the housing, h, to which the brackets, 26, are cast, and are arranged with their heads, 34, in operative relationship to suitable facings, 35. Similar bolts, 33, are provided at the low pressure end. These bolts and the strips, 28, on the brackets, 26, thus assist one another.

In order to minimize heat transmission from the heated turbine parts to the cooled bearings, the rings, 23, at each end of the turbine, are secured to the body of the respective end castings, 3 and 4, by a number of spaced ribs, 36 (see Figs. 2 and 2ª) which may be conveniently formed by drilling out the intervening metal or in any other convenient manner. The facing strips, 31, also assist in preventing transmission of heat to the bearing.

In order to secure the full benefits of the turbine structure above described, it is very desirable that the symmetrical stator should be symmetrically stressed at different temperatures so as the better to maintain its shape. If the blades are calked in place, this condition is only attained accidentally or under very special circumstances, the stresses due to calking in nearly every case being irregular and varying with the temperature. For these reasons I prefer to weld the blades in place electrically, in the manner described, for example, in my English patent specification No. 11921 of 1903; each blade is then heated to very approximately the same temperature and any local stresses set up are similar and symmetrically distributed around the circumference of the stator. For the same reasons, the blades are also preferably welded to the rotor.

It will be seen that with a turbine constructed in the manner and with the precautions above described, the blade-carrying stator, o, of simple symmetrical construction and supported in the manner described is free from the usual distortional stresses to which the stator parts of turbines as at present constructed are subjected and therefore maintains its symmetry on expansion and contraction. The outer casing, 11, to which the pipe connections are attached can be built of any suitable type of boiler work, the packed diaphragms or equivalents between the blade-carrying stator and casing allowing for relative radial movements of these parts, while any small difference in expansion longitudinally is taken up particularly by the elasticity of the spider.

The method of mounting the stator on the main bearings moreover, insures the maintenance of the required co-axial relation between stator and rotor while freely allowing the former to expand or contract radially and finally the proper longitudinal relation of stator and rotor is secured at different temperatures by anchoring one end of the stator parts to the fixed bearing and the other end to the slidable bearing and defining the longitudinal position of the rotor in relation to the slidable bearing by means of the thrust block or equivalent device.

The particular turbine described by way of example is as stated above of the type using superheated steam with interstage reheating. Thus referring to the diagrammatic view of such a system shown in Fig. 12, boiler elements, 37, reheater, 38, and superheater, 39, are arranged to be heated in any convenient manner.

Steam from the boiler passes by way of the pipe, 40, to the superheater and thence through pipe, 41, controlled by a valve, 42, to the connection, 12, on the main turbine casing, 11. Within the casing the steam surrounds the first section of the stator, $o$, and passes through the ducts, 6, to the turbine blading. Alternatively, or in addition, steam may be by-passed through the pipe, 43, controlled by a valve, 44, to the connection, 13, in which case it passes to the blading through the symmetrically arranged ducts, 45 (see Fig. 5$^a$). Having issued from the high pressure blading, the steam passing through the symmetrically disposed apertures, $t^1$, enters the annulus, 46, between stator and outside casing and continues its course through the connection, 14, to the reheater, 38. After reheating, the steam enters the low pressure stage of the turbine through the connection, 15, and passes to the blades through the symmetrically disposed apertures, $t^2$; on issuing from the blades, the expanded steam finally escapes between the arms, 8, of the spider to the exhaust, 16.

If the constructional features according to the present invention are applied to an ordinary (non-reheating) reaction turbine, the steam may be led into the annulus between the stator and casing (see Fig. 13) at the end of the high pressure stage as indicated at 47, and pass thence to the inlet of the high pressure blading; by dispensing with the apertures, $t^1$ and $t^2$, and also with the diaphragm, $u$, the steam then passes completely through the high and low pressure blading to the exhaust as before. Or according to another form, (see Fig. 14), steam is supplied to the stator at the center of its length through a number of symmetrically arranged ducts, 48, and passes axially in both directions through the spiders to the annular space between the stator drum and the outer casing whence it exhausts through the opening, 49. In the example shown, a part of the annular space referred to is shut off by the plates, 50, 51, to form a high pressure steam belt (strengthened as required by the bolts, 52) to distribute steam to the ducts, 48. The side plates, 50, bear internally against piston rings as above described movable radially in grooves formed in the apertured casting, 53, securing together the two parts of the blade-carrying stator drum. The invention is also applicable in certain cases to turbines used as compressors.

Although I have described special examples of my invention in considerable detail, I do not intend thereby to restrict its scope as it will be evident that the underlying principles explained could be embodied in a variety of different structural forms.

Having now described my invention what I claim as new and desire to secure by Letters Patent is:—

1. In combination in a turbine, a rotor and bearings for the same at each end; an outer casing surrounding said rotor and a blade-carrying stator inclosed in said casing and supported independently thereof at each end at points adjoining said bearings.

2. In combination in a turbine, a rotor and bearings therefor at each end; a blade-carrying stator supported at each end by said bearings, and an outer casing surrounding said stator.

3. In combination in a turbine, a rotor; bearings therefor at each end; a blade-carrying stator and an outer casing separate from said bearings and means slidable in relation to one another for maintaining said stator at each end in co-axial relation with said rotor.

4. In combination in a turbine, a rotor; and bearings therefor at each end; a blade-carrying stator; an outer casing; a supporting member common to said stator and casing and means for supporting said common supporting member.

5. In combination in a turbine; a rotor and means for carrying the same at each end; a blade-carrying stator; an outer casing; a supporting member common to said stator and casing; and means for supporting said common supporting member, said means including said rotor-carrying means.

6. In combination in a turbine, a rotor and bearings therefor at each end; a blade-carrying stator and an outer casing separate from said bearings; together with means for maintaining said stator and casing in co-axial relation with said rotor.

7. In combination in a turbine, a rotor; a blade-carrying stator; an outer casing; a resilient connection between said casing and stator to permit differential expansion and means for maintaining said stator in co-axial relation with said rotor.

8. In combination in a turbine, a rotor; a blade-carrying stator; an outer casing and a spider member with resilient arms connecting said casing and stator.

9. In combination, a turbine rotor; a blade-carrying stator; a casing surrounding said stator and a spider support for said stator at its exhaust end, said spider having arms angled to agree substantially with the direction of the exhaust fluid flowing between them.

10. In combination in a turbine, a rotor; a blade-carrying stator; an outer casing; a supporting member common to said stator and casing, said member including an annular part (23) and means for supporting said supporting member.

11. In combination in a turbine, a rotor; a blade-carrying stator; an outer casing; a supporting member common to said stator and casing, said member including an annular part (23) and a part (36) of reduced cross section to lessen heat flow together with means for supporting said annular part.

12. In combination in a turbine, a rotor; bearings therefor and a stator, said stator comprising end walls, and a blade-carrying member and an outer casing each connected directly to said end walls.

13. In combination in a turbine, a rotor subject to axial thrust; a blade-carrying stator; stationary thrust-receiving means at one end of said stator; slidably mounted means at the other end of said stator for transmitting axial thrust on said rotor through said stator to said thrust-receiving means.

14. In combination, a turbine rotor; a blade-carrying stator; separate means for supporting said stator at the ends, said stator and said supporting means having mutually-butting thrust-transmitting elements together with means other than said thrust-transmitting elements for transmitting a pull between said stator and said supporting means.

15. In combination, a turbine rotor; a blade-carrying stator; separate means for supporting said stator; means for maintaining co-axial said rotor and stator while allowing relative radial expansion together with means other than said maintaining means for transmitting a pull between said stator and said supporting means.

16. In combination, a turbine rotor; a blade-carrying stator; a casing surrounding said stator; together with fluid-tight partitions for dividing the space between said stator and casing into belts or annuli, said partitions comprising yieldable members permitting both radial and longitudinal relative displacement of said stator and casing.

17. In combination, a turbine rotor; a blade-carrying stator; a casing surrounding said stator; together with partitions formed of rigid members movable in fluid-tight relation for dividing the spaces between said stator and casing into belts or annuli.

18. In combination, a turbine rotor shell; a shaft on which said shell is mounted; a casing having a part disposed within said shell, and packing means between said shell and said casing.

19. In combination, a turbine rotor shell having a blade-carrying portion; a shaft on which said shell is mounted; a casing having a part disposed within the blade-carrying portion of said shell, and packing means between said blade-carrying portion and said casing part.

20. In combination, a turbine rotor shell; a shaft on which said shell is mounted; a casing having a part disposed within said shell and packing means both between said casing part and said shell and between said casing part and said shaft.

21. In combination, a turbine rotor shell having a blade-carrying portion; a shaft on which said shell is mounted; a casing having a part disposed within said blade-carrying portion and packing means both between said casing part and said blade-carrying portion and between said casing and said shaft.

22. In combination, a turbine rotor; a blade-carrying stator; a casing surrounding said stator; means for dividing the space between said stator and casing into belts or annuli; duct means for leading working fluid from one of said belts to another and means for heating said fluid during its passage through said duct means.

23. In combination in a turbine, a bladed rotor and a bladed stator operatively disposed to form a passage-way for the working fluid; partition means for dividing said passage-way into stages; a casing surrounding said stator; duct means for leading working fluid from one stage to another, said means including space between said stator and casing together with means for heating said fluid during its passage through said duct means.

24. In combination in a turbine, a bladed rotor and a bladed stator operatively disposed to form a passage-way for the working fluid; partition means for dividing said passage-way into stages, a casing surrounding said stator; duct means for leading working fluid from one stage to another, said means including space between said stator and casing together with means disposed outside said casing for heating said fluid during its passage through said duct means.

25. In combination in a turbine; a bladed rotor and a bladed stator operatively disposed to form a passage-way for the working fluid; partition means for dividing said passage-way into stages; a casing surrounding said stator; partition means for dividing the space between said casing and stator into belts or annuli; duct means for leading working fluid from one stage to another, said means including apertures through said stator on each side of said first-mentioned partition means, and including also a belt or annulus on each side of said second-mentioned partition means, together with means for heating said fluid during its passage through said duct means.

26. In combination in a turbine, blade-carrying rotor and stator members and an outer casing inclosing said members, said stator member and outer casing being supported independently of each other at the ends, at least said stator member having blades secured thereto as by welding to avoid irregular stress and so insure maintenance of shape with change of temperature.

27. In combination in a turbine, blade-carrying rotor and stator members, and means for maintaining the shape of the leakage annuli at the ends of said blades irrespective of temperature changes, said means including an outer casing inclosing said members, said outer casing and said stator member being supported independently of each other at the ends.

28. In combination in a turbine, a shaft; a rotor and bearings therefor; a symmetrical blade-carrying stator supported at both ends; means for holding the symmetrical stator concentric in relation to said shaft, together with an unsymmetrical outer casing in radially-free fluid-tight relation to said symmetrical stator.

In testimony whereof I affix my signature in presence of two witnesses.

SEBASTIAN ZIANI DE FERRANTI.

Witnesses:
   ALBERT HALL,
   WILLIAM DUNCAN DAVIDSON.